A. B. LANDIS.
CHANGE SPEED GEARING.
APPLICATION FILED APR. 11, 1914. RENEWED MAY 14, 1918.
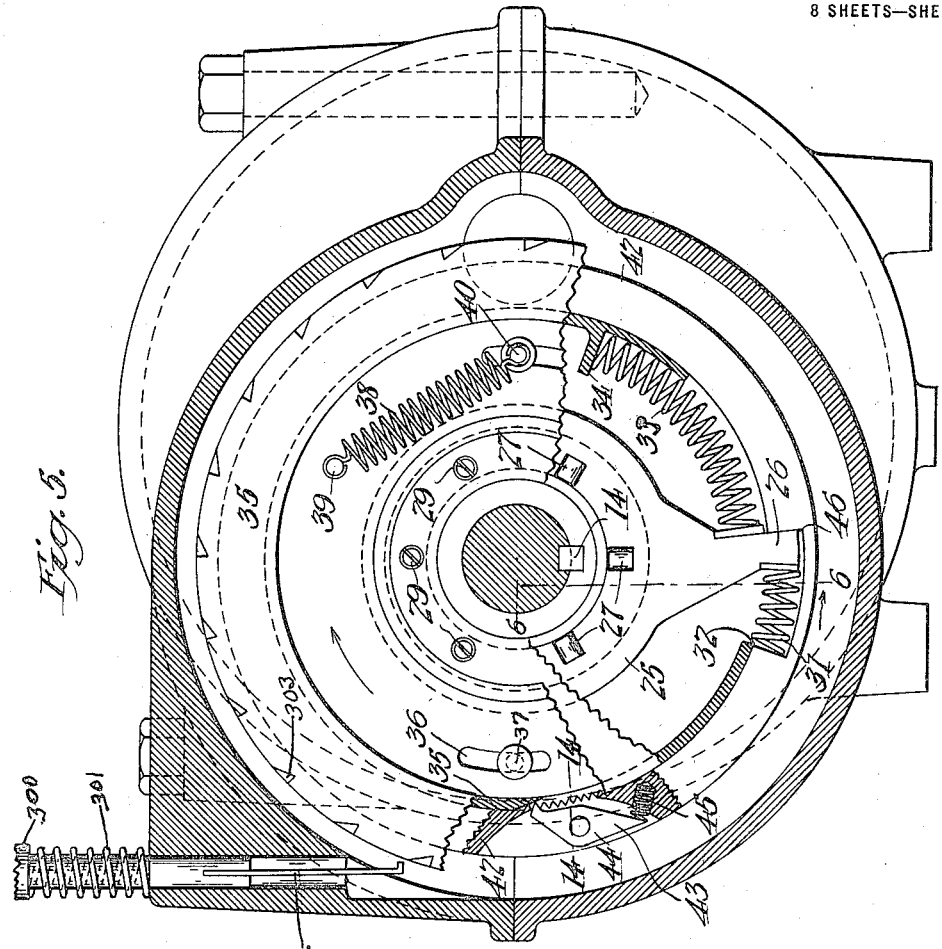
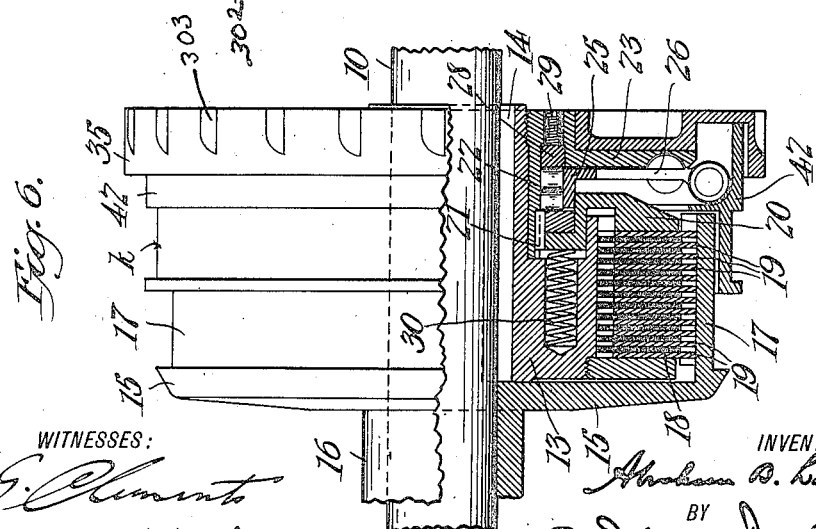

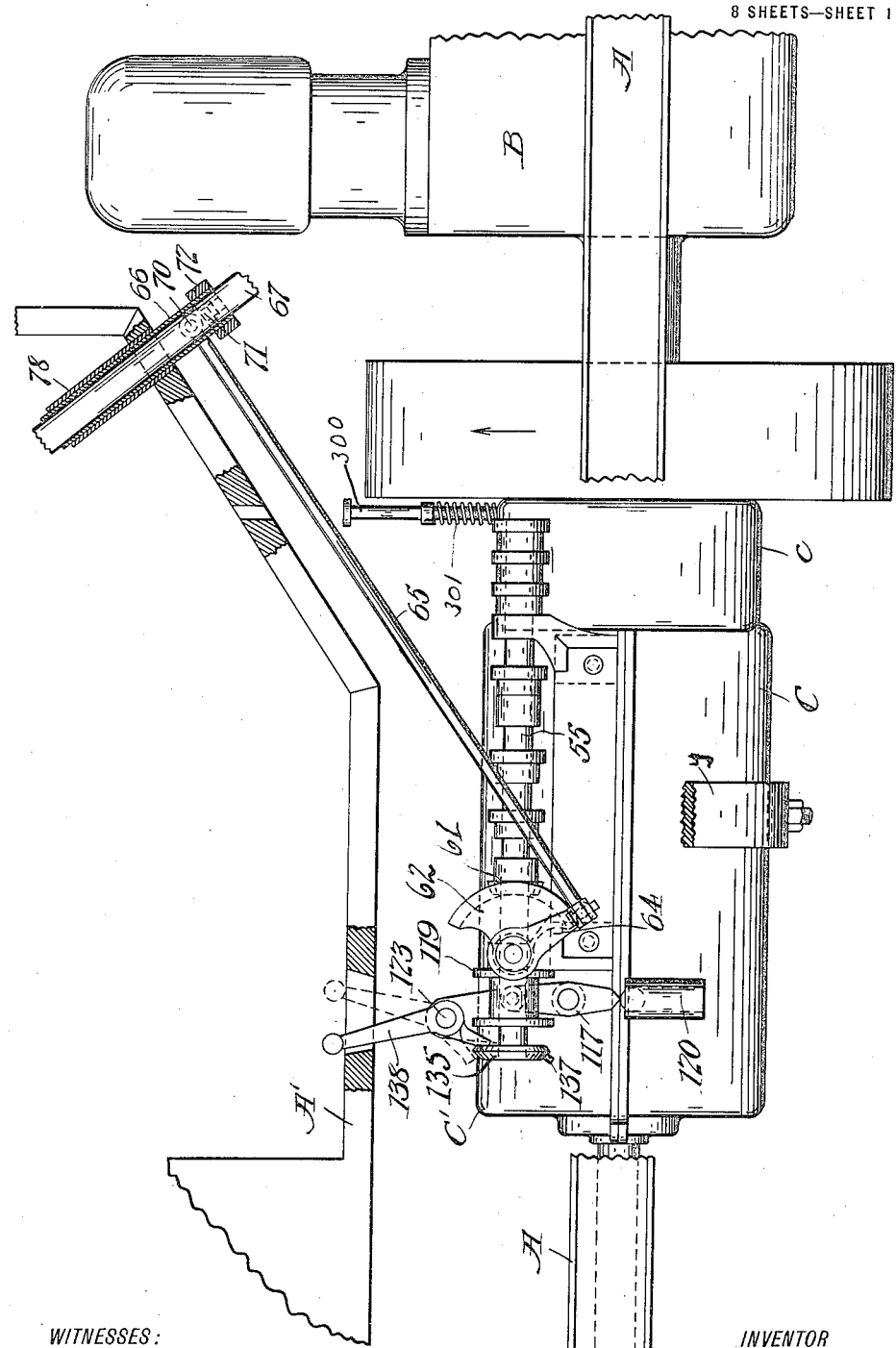

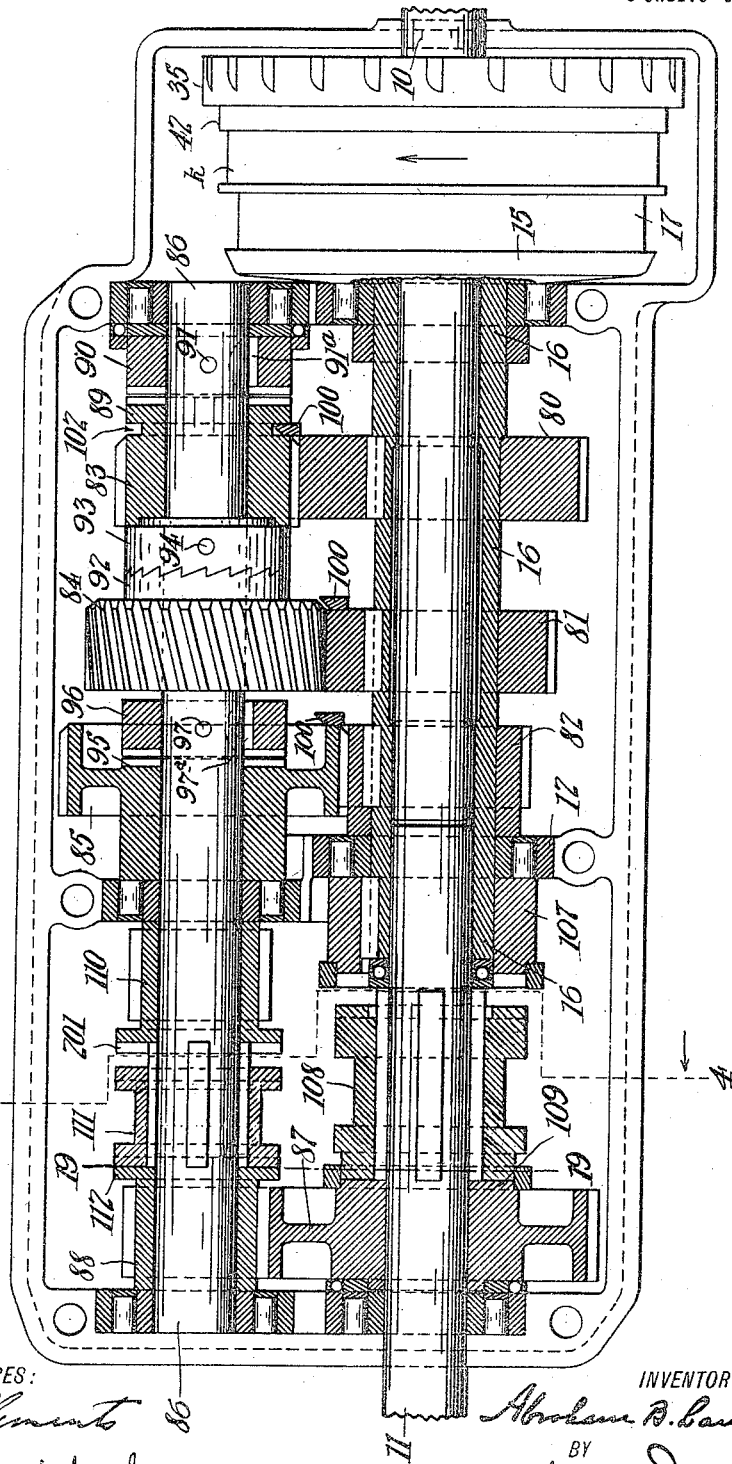

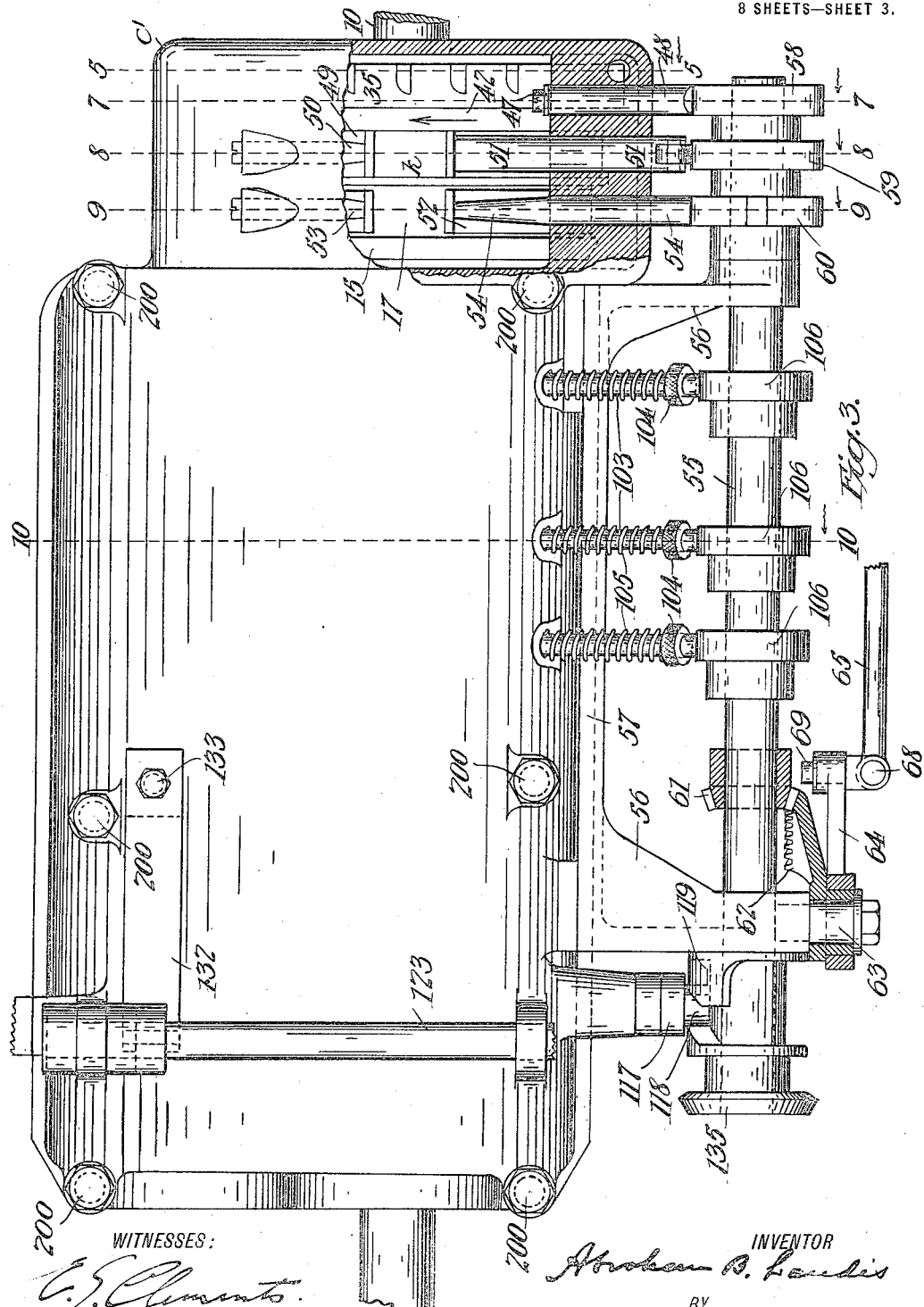

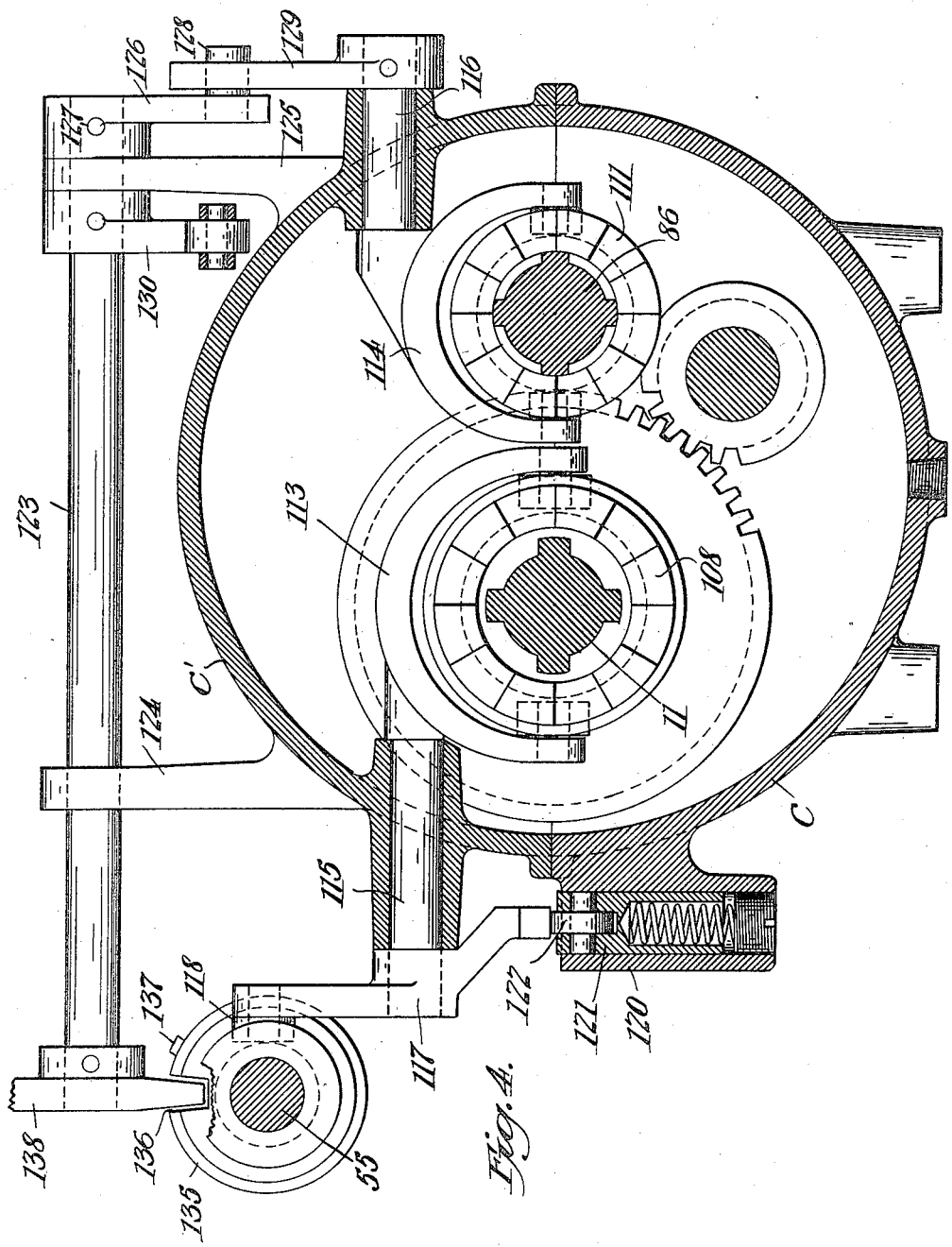

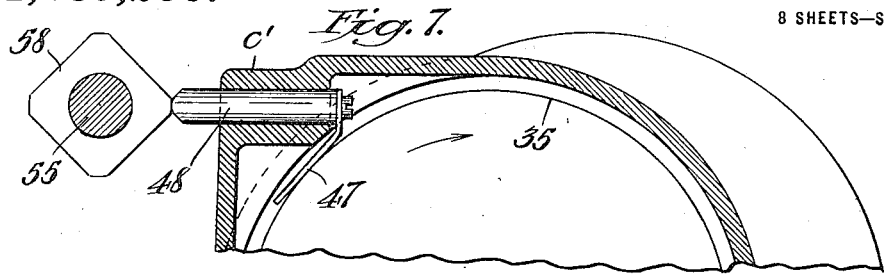
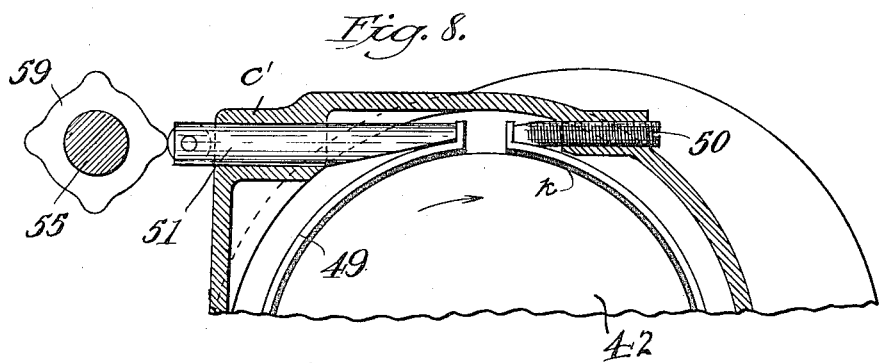
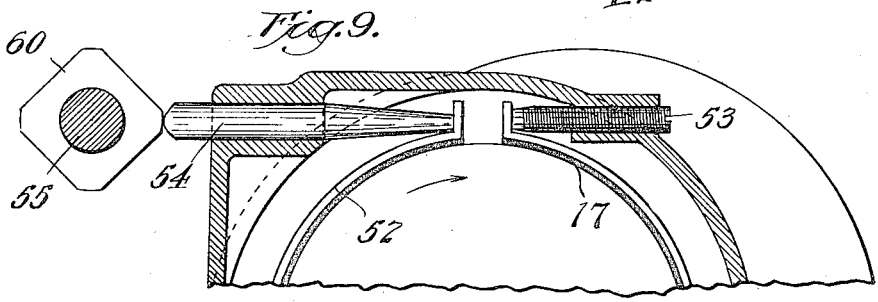
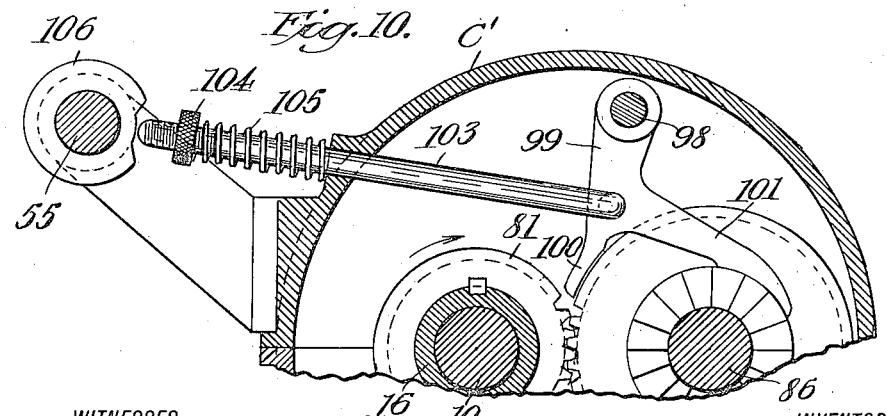

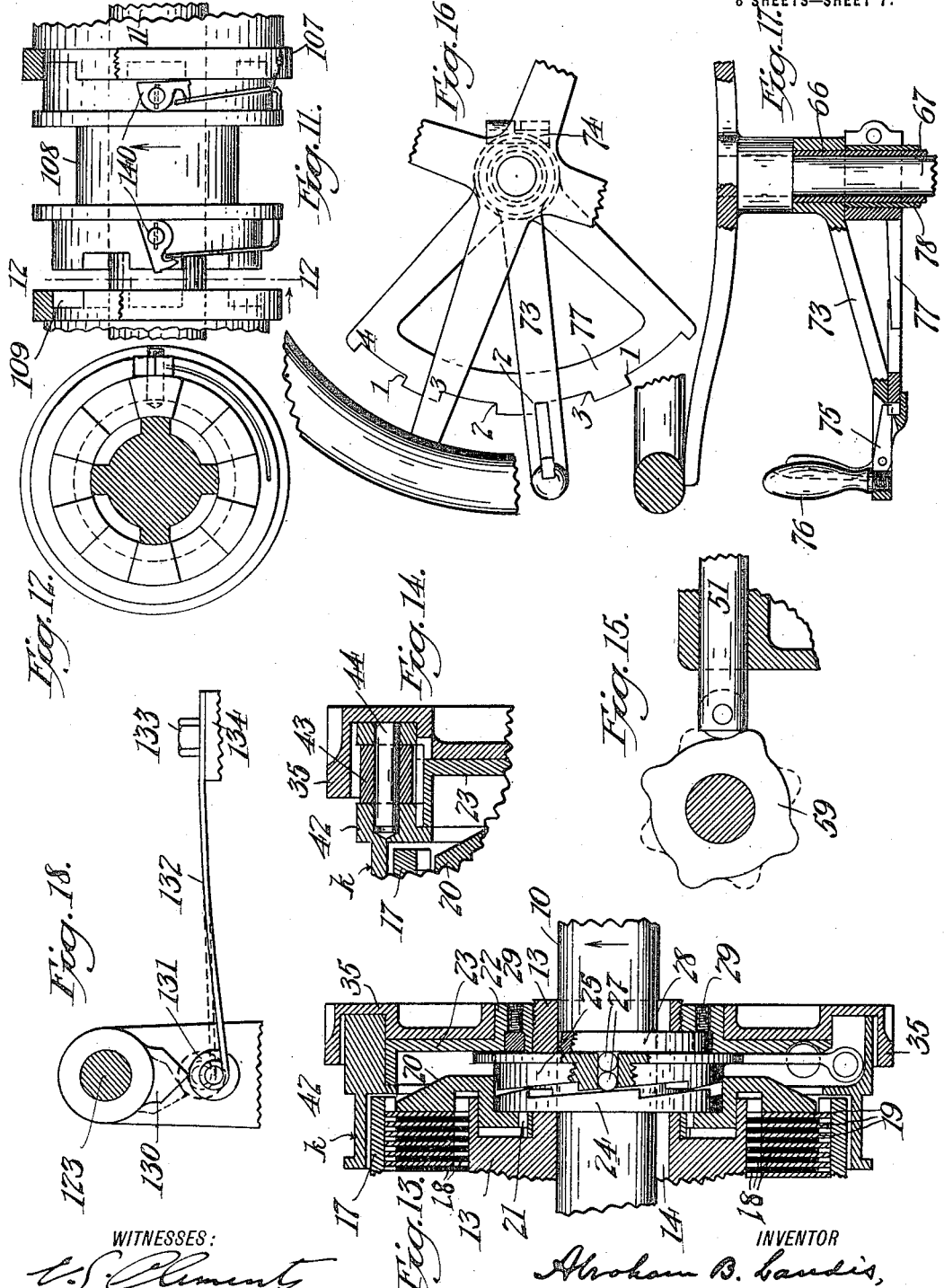

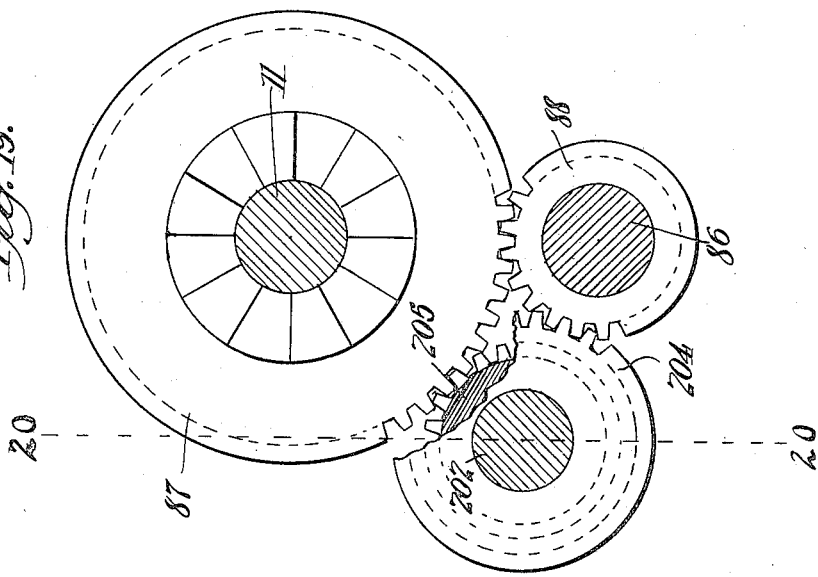
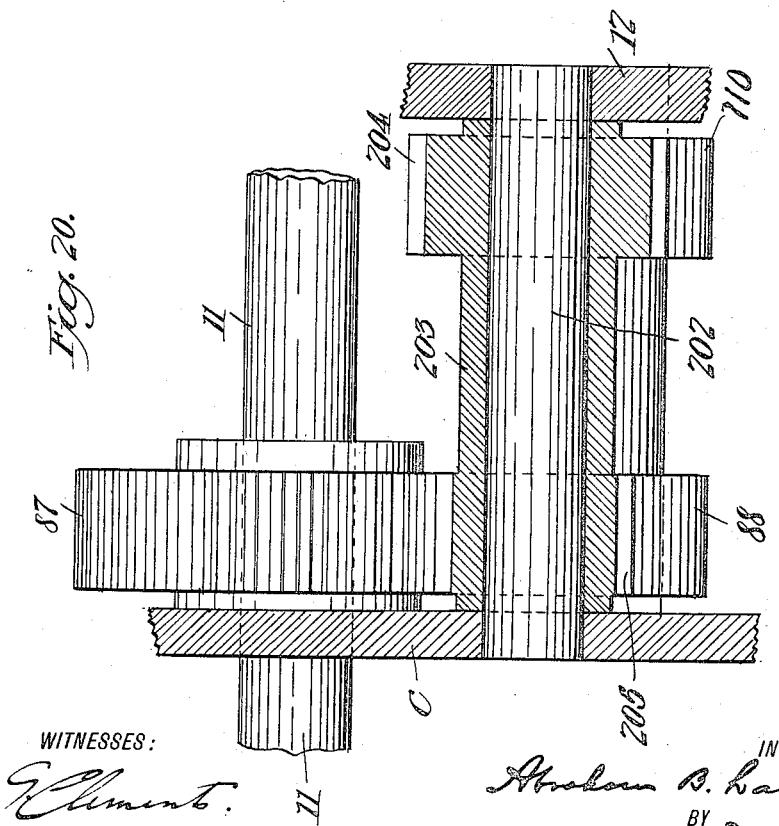

UNITED STATES PATENT OFFICE.

ABRAHAM B. LANDIS, OF ENFIELD, PENNSYLVANIA.

CHANGE-SPEED GEARING.

1,289,200.  Specification of Letters Patent.  Patented Dec. 31, 1918.

Application filed April 11, 1914, Serial No. 831,215. Renewed May 14, 1918. Serial No. 234,531.

*To all whom it may concern:*

Be it known that I, ABRAHAM B. LANDIS, a citizen of the United States, residing at Enfield, Montgomery county, and State of Pennsylvania, have invented and discovered certain new and useful Improvements in Change-Speed Gearing, of which the following is a specification.

My said invention consists in various improvements in the construction and arrangement of parts of change-speed transmission gearing, especially designed for automobile use, of that type in which selective speeds are secured through the means of a frictional clutch, the change in gears to secure the speed desired being made while the frictional clutch is released. In such type of transmission gearing the usual arrangement employed involves sliding the gears into mesh for the different changes of speed and as this can only occur when they come into uniform speed, many difficulties incident to securing the engagement of the teeth result, including a preliminary rasping and clash and requiring expert operation to avoid, even in a limited degree, undue strain, wear and breakage, and also considerable exertion on the part of the operator.

The object of my present invention is to overcome these difficulties and produce such a type of gear wherein the changes may be made with slight exertion, by a simple movement of the hand lever from one point to another, and the change made without any rasping or clash of the gears whatever, all as will be hereinafter more fully described and claimed.

Referring to the accompanying drawings, which are made a part hereof, and on which similar reference characters indicate similar parts, Figure 1 is a side elevation of a transmission gear of my improved construction as applied to the front end of an automobile, illustrating in a diagrammatic way its relative position when in use, Fig. 2 a central longitudinal sectional view through the gear, the top half of the gear casing being removed and the clutch in the right hand end of said gear casing being shown in elevation, Fig. 3 a top or plan view of the complete gear as it appears inclosed in the casing, part of the clutch casing being broken away and sectioned to illustrate features of construction more clearly, Fig. 4 a cross section on the dotted line 4—4 in Fig. 2, Fig. 5 a cross section on the dotted line 5—5 in Fig. 3, Fig. 6 a detail view showing the frictional clutch partly in elevation and partly in central longitudinal section, Fig. 7 a sectional view on the dotted line 7—7 in Fig. 3 through the upper portion of the frictional clutch only to illustrate the operation of the brake and controlling mechanism of the clutch.

Fig. 8 a similar view on the dotted line 8—8 in Fig. 3,

Fig. 9 a similar view on the dotted line 9—9 in Fig. 3,

Fig. 10 a similar view on the dotted line 10—10 in Fig. 3 showing the means of operating and controlling the gear wheels in the transmission gear, Fig. 11 a detail view of a clutch on the driven shaft shown at the left in Fig. 2, Fig. 12 a cross section through the same on the dotted line 12—12, Fig. 13 a central sectional view through the friction clutch, Fig. 14 a sectional view on the dotted line 14—14 in Fig. 5, Fig. 15 a detail view of the end of the controller shaft and operating cam, Fig. 16 a top or plan view of a portion of the hand steering wheel showing the relative position of the speed change controlling lever, Fig. 17 a detail vertical section of the upper end of the parts carried on the steering post illustrated in plan in Fig. 16.

Fig. 18 a detail view of the spring and cam controlling the reversing movement,

Fig. 19 a cross section on dotted line 19—19 in Fig. 2, and

Fig. 20 a view on dotted line 20—20 in Fig. 19.

In said drawings the portions marked A represent the automobile frame, B the engine, and C the transmission gear casing. The parts within said transmission gear casing are referred to by numerals, as will appear in the following description.

The automobile frame, or chassis, A, the body A¹ mounted thereon, and the engine B carried thereby, are all of any approved or desired construction and arrangement.

The transmission gear casing is composed of two parts C and C¹, the part C being carried from the side bars A of the chassis on a yoke $y$ and the upper half $C^1$ being bolted to the lower half C by bolts 200, as indicated in Fig. 3. The two parts of said casing are formed with a smaller portion $c$ and $c^1$, respectively, on the end adjacent to the engine to form a chamber for incasing the friction clutch. The entire gearing is thus inclosed in an oil-tight and dust proof casing, whereby it may run in oil and its operation rendered easy and quiet and all unnecessary wear prevented.

The engine shaft 10 is the driving shaft and the shaft 11 the driven shaft, geared to the automobile driving gear in any approved manner (not shown). Said shafts are journaled in appropriate bearings (preferably roller bearings as shown) in the gear casing, their inner ends being mounted in a central bearing supported in a central web 12 of the gear casing.

The friction clutch comprises a cylindrical center part 13 keyed to the shaft 10 by key 14. A plate or head 15, having a sleeve 16, and a horizontal rim or drum 17 is mounted loosely on shaft 10 adjacent to part 13 with said rim extending parallel with, but spaced a distance therefrom. A series of friction rings 18 are carried on the center part 13 and another series of friction rings 19 are carried by the rim 17 of plate 15. The friction rings 18 are mounted to slide longitudinally by means of tongue and groove, or other appropriate interengaging connection with the part 13 and are interspaced between friction rings 19, and said rings 19 are similarly mounted on the interior of rim 17. A clamping plate 20 is mounted by means of a spline 21 to slide longitudinally on a hub portion 22 of a plate 23. Said plate 23 is screw-threaded onto the outer end of center part 13 and its hub or flange extends into an annular recess therein, as best shown in Figs. 6 and 13. Clamping plate 20 is formed with a bearing face at its outer edge adapted to bear against the outside one of the series of plates 19. A ring 24 is mounted in an annular recess in the outer face of said clamping ring 20 and formed with a series of cams on its outer face. Another ring 25 with corresponding cam faces is mounted adjacent thereto to rock on hub 22 and has a radial arm 26 extending from one side thereof and projecting through a segmental opening in the rim of plate 23, for a purpose to be presently described.

A series of pockets are formed in said ring 25 corresponding to the number of cam faces and a pair of anti-friction rollers 27 are mounted in each of said pockets. A bearing ring 28 is mounted in an annular seat in the inner face of the hub 22 in position to receive the thrust of said roller bearings on one side, and a series of set screws 29 project through screw-threaded perforations from the outside of said hub and bear against said ring, whereby it may be adjusted as required to compensate for any wear in the parts. Clamping plate 20 is normally held outward by a series of springs 30 (Fig. 6) mounted in sockets in the center part 13 and bearing against the inner face of said plate. The normal position of cam ring 25 is maintained by a spring 31 interposed between one side of the outer end of arm 26 and an adjacent seat 32 at one end of a recess in the part 42 which holds said arm normally against shoulder 46 at the other end of said recess. Another spring 33 is interposed between the opposite side of said arm and a seat 34 on said part 23. A ring 35 is mounted on the hub 22 of the part 23 and is connected to rotate thereon to a limited extent controlled by a slot 36 in said ring 35 and a pin 37 extending through said slot into the plate 23. A coiled spring 38 connected at one end to said ring 35 by a pin 39 and at the other end to a pin 40 seated in the plate 23 and projecting through a slot 41, holds said parts in their normal relative position.

A ring 42 is mounted to turn on the periphery of plate 23 and overlaps rim 17 of plate 15. Its outer edge extends into an annular recess in the rear face of ring 35 near its periphery. Said ring 42 has a face $k$ for engagement with a band brake, as will be presently described. A pawl 43 is mounted on a pivot 44 in a recess in the periphery of said ring 42 on one side and is adapted to engage with teeth in the periphery of part 23 and normally hold said part 42 from free rotation, and hold ring 25 in clamping position against ring 24 and plate 20. Said pawl 43 is held into engagement with said notches by a spring 45 (see Fig. 5). Cam ring 25 is adapted to be turned by the turning of said ring 42, through the connection of arm 26 with shoulder 32 under the yielding pressure of spring 31.

As soon as the pawl is released, spring 33 will expand and turn part 23, and also part 35, somewhat, bringing the point of the rim of part 35 beneath the point of the dog 43, and prevents the reëngagement of said dog until the parts are returned to clutch position, as will be presently described. Push-pin 300 is arranged in a socket in the casing, with a spring 301 interposed between its head and the outer face of said casing, and is provided with a dog 302 which is adapted, when said push-pin is forced downward, to engage with one of a series of notches 303 in the periphery of ring 35. Spring 301 serves to hold said push-pin in the upward normal position. Said plate 35, when rotated under the impulse of said push-pin, serves to unlock pawl 43 in ring 42 and thus release the connection which holds the pressure between the parts producing the friction in the clutch. The object of this push-pin is to provide that, when in the event the motor is stopped when the clutch is engaged, as in what is called "choking" the motor, means is at hand to disengage the clutch manually, producing the same result as when it is done through the cam detaining this plate while the motor is running.

A spring retarding brake 47 carried on the inner end of a rod 48 mounted to slide in a perforation in the upper part $c^1$ of the clutch casing bears upon the periphery of the part 35 and normally holds it from rotation. A band brake 49 is mounted around the face $k$ of the ring 42, being carried at one end of the inner end of an adjusting screw 50, and at its other end on the inner end of a sliding rod 51 mounted in a perforation in the upper part of the clutch casing $c^1$ (see Fig. 8). Another band brake 52 is mounted around the rim 17 of the plate 15, one end being carried on the inner end of an adjusting screw 53, and the other end on the inner end of a sliding rod 54 (see Fig. 9).

A controller cam shaft 55 is journaled in bearings formed in the outer ends of arms 56 projecting horizontally from a bracket 57 secured to the upper side of the gear casing. At its forward end it carries a series of cams 58, 59, and 60 which coöperate with the sliding rods 48, 51, and 54, respectively. A bevel gear 61 is mounted on said shaft 55 and a segmental rack 62 mounted on a stud 63 on the outer end of arm 56 meshes therewith. Said segmental rack 62 is connected with a crank arm 64 which in turn is connected by a rod 65 with the lower end of a sleeve 66 mounted around steering shaft 67. Said rod 65 is connected to crank arm 64 by a double pivotal connection consisting of pivots 68 extending in one direction and pivots 69 in the other direction, whereby a universal joint is secured. A similar connection is employed at the opposite end wherein a horizontal pivot 70 connects the end of the rod with the upper end of a vertical pivot 71 mounted in the outer end of a crank arm 72 secured to the lower end of said sleeve. The shifting lever 73 is clamped to the upper end of sleeve 66 by clamping screw 74 and is provided with a spring latch 75 and a handle 76 at its outer end. Said spring latch is adapted to engage with a series of notches in the outer end of a segment 77 which is clamped to the upper end of a tubular steering post casing 78, which is fixed at its lower end in the frame of the automobile body. It will thus be seen that by swinging lever 73 shaft 55 will be rocked and through the rocking of said shaft that cams 58, 59, and 60 will be operated, as will be presently more fully described.

Sleeve 16 of plate 15 extends to a point overlapping the inner end of the driven shaft 11 and has a series of gears 80, 81, and 82 of varying diameters keyed thereon. A complemental set of gears 83, 84, and 85 are loosely mounted on a counter-shaft 86 which is journaled in appropriate bearings (preferably roller bearings as shown) in the gear casing parallel with the shafts 10 and 11. Another gear 87 is loosely mounted on driven shaft 11 and meshes with a loose gear 88 on counter-shaft 86. Gear 83 is formed with a clutch part 89 adapted to engage with a clutch part 90 secured on counter-shaft 86 by a key $91^a$ and a transverse pin 91. Gear 84 has a clutch part 92 adapted to engage with a clutch part 93 secured on counter-shaft 86 by a key (not shown) and a transverse pin 94. Gear 85 has a clutch part 95 on its hub adapted to engage with a clutch part 96 secured on counter-shaft 86 by a key $97^a$ and a pin 97. The gear teeth of the several gears 80, 81, 82, 83, 84, and 85, are of a spiral form as illustrated by gear 84 in Fig. 2, the angle being sufficient to cause the power transmitted to slide the gears into engagement with their companion clutch parts. A rock shaft or rod 98 extends longitudinally through the upper part of the casing and carries a series of arms 99 (see Fig. 10), each of which has a branch 100 with a tapered inner face adapted to contact with a tapered corner on the adjacent edge of the gear to slide and hold said gear out of engagement with its driving clutch, and another branch 101 forming a brake shoe adapted to engage with the hub of the gear. Each of said arms 99 is pivotally connected to a sliding rod 103 mounted in a perforation in the upper part $C^1$ of the gear casing and extending to a point adjacent to the controller shaft 55. Each of said rods 103 is formed screw-threaded at its outer end and has thereon a nut 104 between which and the casing is interposed a coiled spring 105 which normally holds the arm 99 with its branch 101 against the hub of its gear. Said controller shaft 55 has a series of cams 106 thereon adapted to coöperate with the sliding rods 103. One of said cams is illustrated in Fig. 10. The others are duplicates except that the several cams are arranged with their cam faces, or notches, out of line so that but one rod 103 will be operated at the same time.

At the extreme rear end of sleeve 16 a clutch part 107 is keyed thereon with which a double-ended sliding clutch part 108, keyed to shaft 11, is adapted to engage at one end, its other end being adapted to engage with a clutch face 109 on the adjacent end of the hub of the gear 87. A gear 110 with a clutch part 201 on one end is also loosely mounted on counter-shaft 86 and a double-ended sliding clutch part 111 is adapted to engage at one end therewith and at the other end with a clutch face 112 on the adjacent end of the hub of gear 88. Said clutch parts 108 and 111 are engaged by shifting forks 113 and 114, respectively. Shifting fork 113 is mounted on a rock shaft 115 in a bearing in the side of the upper part $C^1$ of the gear casing, and shifting fork 114 is mounted on a rock shaft 116 in a bearing in said upper part $C^1$ of the gear casing. The inner ends of the arms of said shifting forks are provided with anti-friction rollers which engage in circumferential grooves in said respective clutch parts, as best shown in Fig. 4. A double-ended lever 117 is secured to the outer end of rock shaft 115, its lower end being V-shaped and its upper end carries an anti-friction roller 118 adapted to rest in a cam groove in a collar 119 on controller shaft 55. A socket 120 is formed on gear casing C immediately beneath the lower end of lever 117 and a spring plunger 121 is mounted therein having an anti-friction roller 122 at its upper end which is adapted to bear against the V-shaped lower end of said arm. A rock shaft 123 is journaled in uprights 124 and 125 extending upwardly from the respective sides of the upper part $C^1$ of the gear casing. A crank arm 126 is secured to one end of said rock shaft 123 by a transverse pin 127 and is connected by a pivot 128 engaging a bifurcation in the upper end of crank arm 129 on the outer end of rock shaft 116. The bifurcation in arm 129 is not shown, but will be readily understood by an examination of the structure as illustrated at the right in Fig. 4. A depending arm 130 is secured to said shaft 123 alongside post 125 and is formed with a V-shaped lower end. A roller 131 on the free end of a stiff spring 132 secured by a bolt 133 on a boss 134 on the top part $C^1$ of the gear casing bears against the lower end of said arm 130. Collar 119 is formed on its outer end with a flange 135 having a radial opening 136 at one side and a projecting lug 137 alongside one end of said opening which serves to limit the motion of controller shaft on reverse motion before high speed is reached.

Figs. 19 and 20 illustrate the arrangement of gears for securing reverse motion. A short shaft 202 is journaled in suitable bearings at one end in the rear head of the gear casing and at its other in the portion 12, and carries a long loosely mounted sleeve 203 with a gear 204 on one end and a gear 205 on the other. Gear 205 meshes with gear 87 on shaft 11 and gear 204 with gear 110 on shaft 86.

The operation of my said invention will, in the main, be understood from the foregoing description, but may be briefly summed up as follows:

The car being at a standstill and the operator desiring to start the same, throws lever 73 from position 1 on segment 77 over to position 2. This movement operates through the sleeve 66, rod 65, segment 62, gear 61, and shaft 55, to turn cam 59 and operate rod 51 to cause the band brake 49 to impinge on the face $k$ of wheel 42, which through the connection with arm 26 causes cam ring 25 to force the clamping plate 20 inward and engage the friction disks 18 and 19 and start sleeve 16 in motion. The pawl 43 serves to hold the forward motion of cam ring 25 and maintain the driving connection thus established between the clutch center 13 and the rim 17 which is part of said sleeve 16. As the sleeve 16 starts to rotate the cam 106 of the low speed gear 82 is turned to bring its notch to the position shown in Fig. 10, which permits the brake arm 101 to impinge upon the hub of gear 85 and tend to retard its motion so that the spiral form of the teeth of gears 82 and 85 will cause said gear 85 to slide on shaft 86 to engage the clutch parts 95 and 96 and drive said shaft 86. The clutch 111 being in engagement with gear 88, as shown in Fig. 2, and clutch 108 being in engagement with gear 87, the motion of said shaft 86 would be transmitted through said gears to the driven shaft 11. By throwing lever 73 over to position 3 on segment 77 the speed will be increased as follows: The first operation will be to force brake shoe 47 against the periphery of wheel 35 which will halt the motion of said wheel and throw out pawl 43 and permit springs 30 to release the clutch connection between the center 13 and drum 17. The next operation will be to cause band brake 52 to impinge upon the surface of drum 17 and retard its motion and the motion of sleeve 16, bringing the motion of these parts to below the motion of the driving shaft 10 and releasing all positive connection between said driving shaft and said sleeve 16. The next step in the operation is to again throw band brake 49 onto surface $k$ of the ring 42 and by retarding said ring by means of the elements before described reengage the clutch elements and start sleeve 16 into positive motion. At the same time the next cam 106, in the manner before described, causes the coupling up of the gears 81 and 84, which represent the next speed, and the speed of the driven shaft will be increased, as readily understood. The position of the cams 58, 59, 60, and 106, are so related that before the wheel 42 is clamped by the band brake 49, band brake 52 is released from its engagement with drum 17 and brake 47 is released from the wheel 35. The cams 106 are so arranged that they act successively, and only one at a time, so that whenever one of the cams 106 is in the position shown in Fig. 10, the other two will be in a position to force and lock the arms 99 with their branches 100 against the rims of two or the three gear wheels 83, 84, and 85, as, for example, 83 and 85 as illustrated in Fig. 2. The change from the second speed to the highest speed is attained in the same manner by throwing lever 73 from the position 3 to the position 4 on segment 77. To stop the car the operator merely throws lever 73 from position 4 to position 1, which releases all of the driving connections and permits the car to be stopped by applying the brakes in the usual manner.

When it is desired to reverse the car the operator, through lever 138, the rock shaft 123, and the shifting fork 114, forces clutch 111 from engagement with gear 88 into engagement with gear 110, which transmits the motion through the gears on sleeve 203 to gear 87 and drives the shaft 11 in the reverse direction. When it is desired to drive direct from sleeve 16 to shaft 11, collar 119 is turned with shaft 55 to throw lever 117 and shifting fork 113 to throw clutch 108 into engagement with gear 107, when the speed of shaft 116 will be transmitted direct to shaft 11. In Figs. 11 and 12 I have illustrated devices consisting of spring dogs 140 which are mounted on the periphery of the opposite clutch ends of clutch 108 and normally project outward to hold the clutch out of engagement. The dog at the left in Fig. 11 is in its normal position and when clutch 108 is thrown over to engage with clutch face 109, the dog will prevent such engagement so long as the speed of part 109 is greater than that of clutch 108. As soon as the speed of 109 falls back, however, to equal or below that of 108, the dog will turn on its pivot and permit the clutch to go into engagement under the impulse of the spring plunger 121. A like operation takes place at each reversal of the position of the clutch.

The spring 132 operating over the cam end of part 130 holds clutch 111 under positive sliding force until it is fully engaged as it is shifted from one position to another, as will be readily understood. On the rim of part 135 is formed a projection 137 located in the path of the lower end of lever 138 and serves to prevent shaft 55 from being turned when the lever 138 is in the position shown by dotted lines in Fig. 1 to the high speed position, thus avoiding the danger of high speed on reverse motion.

Having thus fully described my said invention, what I claim as new and desire to secure by Letters Patent is:

1. A change speed gearing comprising driving and driven elements, a frictional clutch for coupling said elements, a series of change speed gears interposed between said elements, means by which one of the gears is automatically made inactive and another active while the frictional clutch is disengaged, means for releasing said frictional clutch, and means for automatically retarding the motion of said driven element at the release of said clutch, substantially as set forth.

2. A change speed gearing comprising a driving element, a driven element, a frictional clutch coupling said elements, change speed gears interposed between said elements, means adapted to automatically engage and disengage said change speed gears while said frictional clutch is disengaged, means for disengaging said frictional clutch, means to automatically retard the motion of the driven element when said clutch is disengaged, and means for throwing the gears into operative engagement when the speeds of the two elements coincide, substantially as set forth.

3. A change speed gearing comprising a driving shaft, a driven shaft, a counter-shaft parallel with said other shafts, gears carried on said respective shafts, means for effecting transmission engagement between selective gears, means for holding the gears out of driving relation until the speeds of the two elements substantially coincide, a clutch forming part of the means for transmitting motion from the driving shaft to the gears, and means for automatically clutching and unclutching said clutch by the rotary motion thereof, substantially as set forth.

4. A change speed gearing comprising a driving shaft, a driven shaft, gears connecting said shafts, a clutch forming part of the means for coupling the driving shaft to the driving gears, means for automatically engaging and disengaging said clutch, and means to check the motion of the driven shaft when the clutch is disengaged, substantially as set forth.

5. A change speed gearing comprising a driving shaft, a driven shaft, a counter-shaft parallel therewith, loosely mounted gears upon said counter-shaft engaging with gears carried by said driven shaft, clutches for engaging said loosely mounted gears to the counter-shaft, one at a time, and an automatically operated transmission clutch between the driving shaft and the gears for operating the driven shaft, substantially as set forth.

6. A change speed gearing comprising driving and driven elements, a frictional clutch coupling said elements, a series of change speed gears, means for automatically engaging and disengaging said gears, means for disengaging said frictional clutch, means to automatically retard the speed of the driven element when said clutch disengages, and means by which said clutch is reengaged, substantially as set forth.

7. A change speed gearing comprising a driving shaft, a driven shaft, a counter-shaft, gears loosely mounted on said counter-shaft, a frictional clutch on said driving shaft embodying a sleeve loosely mounted on said driving shaft and adapted to be coupled to said driving shaft by said clutch, fixed clutch parts on said counter-shaft, and means for automatically and consecutively engaging and disengaging said gears at each release and engagement of said frictional clutch, substantially as set forth.

8. A change speed gearing comprising a driving shaft, a driven shaft, a counter-shaft through which motion may be transmitted from said driven shaft to said driving shaft, gears on said counter-shaft, a frictional clutch forming part of the gear for connecting said driving shaft to said driven shaft arranged to automatically engage and disengage by its rotary motion, and means arranged to be operated simultaneously for automatically changing the engagement of gears on said counter-shaft as said frictional clutch is operated, substantially as set forth.

9. A change speed gearing comprising a driving shaft, a driven shaft, a clutch secured to said driving shaft, a sleeve loosely mounted on said driving shaft and secured to one of the driven clutch elements, gears secured to said sleeve, a counter-shaft, loosely mounted gears on said counter-shaft engaging with said gears on said sleeve, fixed clutch parts alongside said loosely mounted gears on said counter-shaft, a gear secured on said counter-shaft, another gear secured to the driven shaft and engaging with the gear on said counter-shaft by a clutch, said driven shaft being arranged in alinement with said driving shaft, substantially as set forth.

10. A change speed gearing comprising a driving shaft, a driven shaft in alinement therewith, a counter-shaft parallel therewith, a driving clutch secured on said driving shaft, a sleeve loosely mounted on said driving shaft and secured to a driving clutch part, means for engaging and disengaging said clutch, gears secured to said loosely mounted sleeve, loosely mounted gears on said counter-shaft, clutches for securing said loosely mounted gears in turn to said counter-shaft, another gear secured to said counter-shaft, a gear secured to said driven shaft by means of a clutch and engaging with said gear on said counter-shaft, a clutch part secured to the end of said loosely mounted sleeve on said driving shaft, and a clutch part on the adjacent end of the driven shaft adapted to engage therewith, whereby the driving shaft may be directly engaged with the driven shaft, substantially as set forth.

11. A change speed gearing comprising a driving shaft, a driven shaft in alinement therewith, a counter-shaft parallel with said other shafts, a driving clutch interposed between the driving shaft and the driven shaft, a sleeve forming part of said clutch normally loosely mounted upon said driving shaft, gears secured to said sleeve, other gears loosely mounted on said counter-shaft engaging therewith, clutch parts fixed on said counter-shaft, means for throwing said gears on said counter-shaft into and out of engagement with said clutch parts thereon, means for selecting the gears and controlling the operation of said clutches, and means for automatically operating the driving clutch, substantially as set forth.

12. A change speed gearing comprising a driving shaft and a driven shaft in alinement with each other, a transmission clutch comprising parts keyed to said driving shaft and a part loosely mounted on said driving shaft, gears secured to said loosely mounted part, a counter-shaft, gears loosely mounted on said counter-shaft to mesh with the gears carried by said loosely mounted clutch part, clutches on said counter-shaft arranged to engage and couple said loosely mounted gears thereto, one at a time, another gear on said counter-shaft, a gear on the driven shaft meshing therewith, a sliding clutch on said counter-shaft adapted to engage with said gear thereon, another sliding clutch on the driven shaft adapted to engage with the gear thereon which meshes with the gear on said counter-shaft, and means for operating said several clutches, substantially as set forth.

13. A change speed gearing comprising a driving shaft, a driven shaft in line therewith, a driving clutch on said driving shaft, a sleeve surrounding said driving shaft and carried by the loose part of said clutch, gears keyed to said sleeve, a counter-shaft, complemental gears loosely mounted on said counter-shaft, clutches for securing said complemental gears to said counter-shaft one at a time, a gear on the driven shaft, a gear on the counter-shaft meshing with said gear on the driven shaft, clutches for coupling said gears to their respective shafts, and a clutch part on the end of the sleeve surrounding the driving shaft arranged to be coupled to the driven shaft by a sliding clutch, substantially as set forth.

14. A change speed gearing comprising a driving shaft, a driven shaft, a sleeve on said driving shaft connected with a part of said clutch, gears secured to said sleeve, complemental gears on the counter-shaft engaging therewith, and formed with teeth set at an angle, clutches for securing said gears to the counter-shaft, and gears connecting said counter-shaft and driven shaft, whereby the power transmitted is adapted to push the gear sidewise and clutch said gears to the counter-shaft, substantially as set forth.

15. A change speed gearing comprising a driving shaft, a driven shaft, a driving clutch on the driving shaft, a sleeve loosely mounted on said driving shaft and carried by a part of said clutch, gears keyed to said sleeve, a counter-shaft, complemental gears on said counter-shaft, clutches for securing said gears to said counter-shaft, the teeth of said gears being formed at an angle, whereby the power transmitted is adapted to push the gears sidewise to engage the clutches and said clutches being formed with teeth of ratchet form whereby when the counter-shaft runs ahead said clutches will become disengaged, a frictional shoe pressing on the hub of said loosely mounted gear for causing the angle of the teeth to thrust the clutches together, means for automatically releasing said shoe when said clutches are disengaged, and a part carried by said shoe arranged to hold said clutches disengaged, substantially as set forth.

16. A change speed gearing comprising a driving shaft, a driven shaft, a frictional clutch connecting said shaft, means for successively and automatically securing and releasing said clutch, means for automatically changing the driving connection between the several change speed gears while said frictional clutch is released, means for detaining the driving member of the frictional clutch as soon as it is released to allow the engagement of the clutch gears without clash, substantially as set forth.

17. A change speed gearing comprising a driving shaft, a driven shaft, a frictional clutch arranged to automatically clutch and release, cams for controlling the operation, means for rotating said cams at will by the operator, and gearing appropriately arranged and connected to secure the speed desired, substantially as set forth.

18. A change speed gearing comprising a driving shaft, a driven shaft, a frictional clutch for transmitting motion from said driving shaft to said driven shaft, a train of change speed gears interposed between said shafts and arranged in pairs, one gear of each pair being mounted to run loosely and the other made fast, a clutch for securing each loose gear to its shaft, means for selectively engaging said loose gears, and means for holding the clutch out of engagement until the speed of the two parts coincides, substantially as set forth.

19. A change speed gearing comprising a driving shaft, a driven shaft, a counter-shaft, a train of gears on said shaft, a shaft journaled on the outside of the casing, cams on said shaft by which the securing and releasing of the clutches and the shifting of the gears on said counter-shaft are controlled, said cam shifting being operated through a lever arranged within reach of the operator in the car, substantially as set forth.

20. A change speed gearing comprising a driving shaft, a driven shaft, a friction clutch between the two by which power is transmitted from one to the other, intermeshing transmission gears of varying diameters interposed between said shafts, a series of driving clutches for connecting one or the other of said gears in the driving train, means for controlling said clutches, one of said clutches being mounted on the driven shaft between adjacent clutch faces of gears which are adapted to engage by a sliding motion, and pivoted dogs mounted on one part and adapted to engage with the other to prevent their engagement until the speeds of the two clutching elements coincide, substantially as set forth.

21. A change speed gearing comprising a driving shaft, a sleeve on said driving shaft, gears on said sleeve, a driven shaft, a counter-shaft parallel therewith, loosely mounted gears upon said counter-shaft engaging with gears carried on a sleeve on said driving shaft, clutches on said counter-shaft for engaging said loosely mounted gears thereto, means for controlling said clutches to bring only one into operation at a time, a clutch for coupling the driving shaft to the sleeve thereon, and means for operating said clutch through the rotary motion of the driving shaft, substantially as set forth.

22. A change speed gearing comprising a driving shaft, a sleeve mounted on said driving shaft, a driven shaft, a counter-shaft, gears loosely mounted on said counter-shaft, a frictional clutch on said driving shaft arranged to couple said driving shaft and said sleeve, gears mounted on said sleeve arranged to engage the loosely mounted gears on the counter-shaft, fixed clutch parts on said counter-shaft, and means for consecutively engaging and disengaging said gears on said counter-shaft one at a time at each release and engagement of said frictional clutch, substantially as set forth.

23. A change speed gearing comprising a driving shaft, a sleeve on said driving shaft, a driven shaft, a driving clutch element secured to the driving shaft, a driven clutch element secured to said sleeve, gears secured to said sleeve, a counter-shaft, complemental gears on said counter-shaft, the teeth of the gears on said sleeve and on said counter-shaft being formed at an angle whereby the power transmitted will tend to move said gears sidewise to engage clutches on said counter-shaft, said clutches fixed to said counter-shaft and adapted to engage clutch faces on the adjacent sides of said gears, said clutches being formed with ratchet teeth, whereby when the counter-shaft runs faster than the driven clutch element, said ratchet clutches will become disengaged, a frictional shoe adapted to press on the hub of said loosely mounted gears for retarding the motion of said gears and causing the angle of the teeth to engage the clutches, and means for automatically releasing said shoe when said clutches are disengaged, substantially as set forth.

24. A change speed gearing comprising a driving element, a driven element, a frictional clutch for coupling said elements arranged to be operated by the rotary motion of the driving element, a series of change speed gears upon said driven element connected with similar gears on a countershaft, clutches adapted to couple said gears to said countershaft, a shaft having a series of cams for operating and releasing the frictional clutch members and controlling the coupling and uncoupling of said countershaft gears, substantially as set forth.

25. A change speed gearing comprising a driving shaft, a driven shaft, a countershaft, a frictional clutch interposed between the driving shaft and the driven shaft, change speed gears interposed between said driving shaft and said driven shaft, a shaft having a series of cams thereon for operating the securing and releasing mechanism of the frictional clutch, whereby the clutching and unclutching may be consecutively controlled by the operator, an operating lever, a connection between said operating lever and said cam shaft, said lever having a stop thereon by which any predetermined speed may be positively acquired, substantially as set forth.

26. A change speed gearing comprising a driving shaft, a driven shaft, a countershaft, a frictional clutch by which power is transmitted from the driving shaft to the driven shaft, gears of different diameters connecting said driving shaft and said counter-shaft, a pair of gears on said countershaft having clutch faces on their adjacent sides, a sliding clutch between them, a lever engaging another lever upon another shaft, a lever on the last named shaft by which it may be actuated to slide on said clutch, a cam shaft, a collar on said cam shaft having a slot to receive the end of a lever and allow the action of said sliding clutch only when the frictional clutch is released and the gear is set for the lowest speed, substantially as set forth.

27. A change speed gearing having a driving shaft, a driven shaft in alinement therewith, a frictional clutch interposed between said driving shaft and said driven shaft, a counter-shaft, gearing of varying diameters for connecting said driving shaft with said counter-shaft, a clutch on the end of the driving shaft adapted to be engaged with the clutch on the driven shaft for direct drive, a cam shaft, cams on said cam shaft for controlling the various speeds and the stop and start action, a collar on said cam shaft having a projection, a lever for controlling the backward movement adapted to contact with said projection and prevent the cam shaft from being turned to the point of clutching the driving and driven shafts while the gearing is set for the reverse motion, substantially as set forth.

28. A change speed gearing comprising a driving shaft, a driven shaft, a clutch interposed between said driving shaft and said driven shaft, means for automatically coupling said clutch by the rotary motion of the driving shaft, means for checking the motion of the driven clutch element upon the release of the clutch whereby the selective clutch gears are retarded to a speed below that of the countershaft and said clutch gears caused to engage as soon as their speed advances and substantially coincides with the speed of the countershaft, thereby avoiding shock when the clutch engages, substantially as set forth.

29. A change speed gearing comprising a driving shaft, a driven shaft, a frictional clutch coupling, said driving shaft and said driven shaft, a series of change speed gears on said driven shaft, a countershaft, other gears on said countershaft engaging said gears on the driving shaft, clutches for coupling said gears to said countershaft and means to prevent the engagement of said clutches until the speed of said gears coincides with the speed of the countershaft, whereby any shock upon engagement of said clutches is avoided, substantially as set forth.

30. A change speed gearing comprising a driving element, a driven element, a frictional clutch arranged to automatically couple and uncouple said elements by the rotary motion thereof, and means for automatically checking the driven element when said clutch is uncoupled whereby the change speed is affected without shock upon the parts, substantially as set forth.

In witness whereof, I have hereunto set my hand and seal at Philadelphia, Pennsylvania, this eighteenth day of March, A. D. nineteen hundred and fourteen.

ABRAHAM B. LANDIS. [L. S.]

Witnesses:
S. C. MILLWARD,
JAS. WITTE.